(12) United States Patent
Kobayashi et al.

(10) Patent No.: US 9,958,076 B2
(45) Date of Patent: May 1, 2018

(54) FLOW PASSAGE PARTITION STRUCTURE AND FLUID CONTROL VALVE

(71) Applicant: AISIN SEIKI KABUSHIKI KAISHA, Kariya-shi, Aichi-ken (JP)

(72) Inventors: Masaki Kobayashi, Okazaki (JP); Yoshiaki Yamakawa, Toyota (JP); Hiromitsu Shigyo, Toyota (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 6 days.

(21) Appl. No.: 15/165,360

(22) Filed: May 26, 2016

(65) Prior Publication Data

US 2016/0348542 A1 Dec. 1, 2016

(30) Foreign Application Priority Data

May 27, 2015 (JP) .................. 2015-107512

(51) Int. Cl.
| | |
|---|---|
| *F01L 1/46* | (2006.01) |
| *F16K 15/04* | (2006.01) |
| *F16K 11/07* | (2006.01) |
| *F16K 31/06* | (2006.01) |
| *F01L 1/344* | (2006.01) |
| *F16K 17/26* | (2006.01) |
| *F01L 1/047* | (2006.01) |

(52) U.S. Cl.
CPC .......... *F16K 15/044* (2013.01); *F01L 1/3442* (2013.01); *F16K 11/07* (2013.01); *F16K 17/26* (2013.01); *F16K 31/0613* (2013.01); *F01L 2001/0476* (2013.01); *F01L 2001/34433* (2013.01); *F01L 2001/34436* (2013.01); *F01L 2001/34463* (2013.01); *F01L 2001/34469* (2013.01); *F01L 2001/34479* (2013.01); *F01L 2001/34483* (2013.01); *F01L 2103/00* (2013.01); *F01L 2250/02* (2013.01)

(58) Field of Classification Search
CPC ..... F01L 2001/34426; F01L 2001/3443; F01L 2001/34433; F01L 2001/34436
USPC ........................................ 123/90.17
See application file for complete search history.

(56) References Cited

U.S. PATENT DOCUMENTS

| | | |
|---|---|---|
| 8,397,687 B2 | 3/2013 | Lichti |
| 8,726,866 B1 * | 5/2014 | Lichti ....................... F01L 1/34 123/90.15 |
| 2016/0076408 A1 | 3/2016 | Nagura et al. |
| 2017/0234174 A1 | 8/2017 | Yamakawa et al. |

* cited by examiner

*Primary Examiner* — Jorge Leon, Jr.
(74) *Attorney, Agent, or Firm* — Buchanan Ingersoll & Rooney PC

(57) ABSTRACT

A flow passage partition structure including a flow passage member including a flow passage space portion, a partition member partitioning the flow passage space portion into a first flow passage and a second flow passage, the partition member including a first plate and a second plate being in contact with the first plate in a state where the second plate is press-fitted in an inner circumferential surface of the flow passage space portion, the first plate including an outer circumferential surface that is out of contact with the inner circumferential surface of the flow passage space portion, and the first plate, the second plate, and the inner circumferential surface of the flow passage space portion forming a space portion that corresponds to a foreign material storage portion.

12 Claims, 6 Drawing Sheets

FLOW PASSAGE PARTITION STRUCTURE AND FLUID CONTROL VALVE

CROSS REFERENCE TO RELATED APPLICATIONS

This application is based on and claims priority under 35 U.S.C. § 119 to Japanese Patent Application 2015-107512, filed on May 27, 2015, the entire content of which is incorporated herein by reference.

TECHNICAL FIELD

This disclosure generally relates to a flow passage partition structure and a fluid control valve using the flow passage partition structure.

BACKGROUND DISCUSSION

For example, a known valve timing control apparatus of an internal combustion engine includes an OCV (oil control valve) provided at a flow passage space portion formed at a bolt fixing a driven side rotary member to a camshaft (far example, refer to US2012/097122A1 which will be hereinafter referred to as Patent reference 1). The flow passage space portion of the bolt is formed to be coaxial with the driven side rotary member, and a partition member is fitted in the flow passage space portion. The flow passage space portion is partitioned by the partition member into flow passages supplying working fluid to an advanced angle chamber or a retarded angle chamber and flow passages discharging the working fluid from the advanced angle chamber or the retarded angle chamber.

At the configuration of Patent reference 1, when the partition member is fitted into the flow passage space portion of the bolt serving as a flow passage member, the partition member moves in a sliding manner relative to an inner surface of the bolt and either the partition member or the inner surface of the bolt is scraped, and accordingly a chip may be generated. In a case where the chip enters the flow passage, an inconvenience occurs which includes a harmful influence on an operation of a valve provided at the flow passage.

A need thus exists for a flow passage partition structure which is not susceptible to the drawback mentioned above.

SUMMARY

According to an aspect of this disclosure, a flow passage partition structure includes a flow passage member including a flow passage space portion through which fluid flows, a partition member partitioning the flow passage space portion into a first flow passage and a second flow passage, and the partition member including a first plate being inserted into the flow passage space portion from one opening end portion of the flow passage member, and being in contact with a step portion provided at a boundary between the first flow passage and the second flow passage at an innermost side in an insertion direction of the first plate, a second plate being inserted into the flow passage space portion after the first plate is inserted into the flow passage space portion, the second plate being in contact with the first plate in such a manner that the second plate overlaps the first plate in a state where the second plate is press-fitted in an inner circumferential surface of the flow passage space portion, the first plate including an outer circumferential surface that is out of contact with the inner circumferential surface of the flow passage space portion, and the first plate, the second plate, and the inner circumferential surface of the flow passage space portion forming a space portion that corresponds to a foreign material storage portion.

According to another aspect of this disclosure, a fluid control valve of a valve timing control apparatus, the valve timing control apparatus including a drive side rotary member rotating synchronously with a crankshaft of an internal combustion engine, a driven side rotary member arranged coaxially with the drive side rotary member and rotating synchronously with a camshaft of the internal combustion engine, a fluid pressure chamber divided into an advanced angle chamber and a retarded angle chamber, and a bolt arranged by insertion in the driven side rotary member to be coaxial with a rotary axis of the driven side rotary member and connecting the driven side rotary member and the camshaft to each other, the fluid control valve including a passage partition structure including a flow passage member including a flow passage space portion through which fluid flows, and a partition member partitioning the flow passage space portion into a first flow passage and a second flow passage, the partition member including a first plate being inserted into the flow passage space portion from one opening end portion of the flow passage member, and being in contact with a step portion provided at a boundary between the first flow passage and the second flow passage at an innermost side in an insertion direction of the first plate, a second plate being inserted into the flow passage space portion after the first plate is inserted into the flow passage space portion, the second plate being in contact with the first plate in such a manner that the second plate overlaps the first plate in a state where the second plate is press-fitted in an inner circumferential surface of the flow passage space portion, the first plate including an outer circumferential surface that is out of contact with the inner circumferential surface of the flow passage space portion, and the first plate, the second plate, and the inner circumferential surface of the flow passage space portion forming a space portion that corresponds to a foreign material storage portion, wherein the first plate and the second plate are inserted in a hole portion provided in a direction of the rotary axis at the bolt, and the first flow passage and the second flow passage are provided at the hole portion, and the fluid control valve supplies and discharges working fluid relative to the fluid pressure chamber.

BRIEF DESCRIPTION OF THE DRAWINGS

The foregoing and additional features and characteristics of this disclosure will become more apparent from the following detailed description considered with the reference to the accompanying drawings, wherein:

FIG. 8 is a cross-sectional view illustrating a part of a second plate according to a modification of the embodiment disclosed here.

DETAILED DESCRIPTION

A first embodiment disclosed here will be described hereunder with reference to the drawings. The present embodiment is an example in which a flow passage partition structure is applied to an OCV (oil control valve) provided at a valve timing control apparatus.

Figure 1:
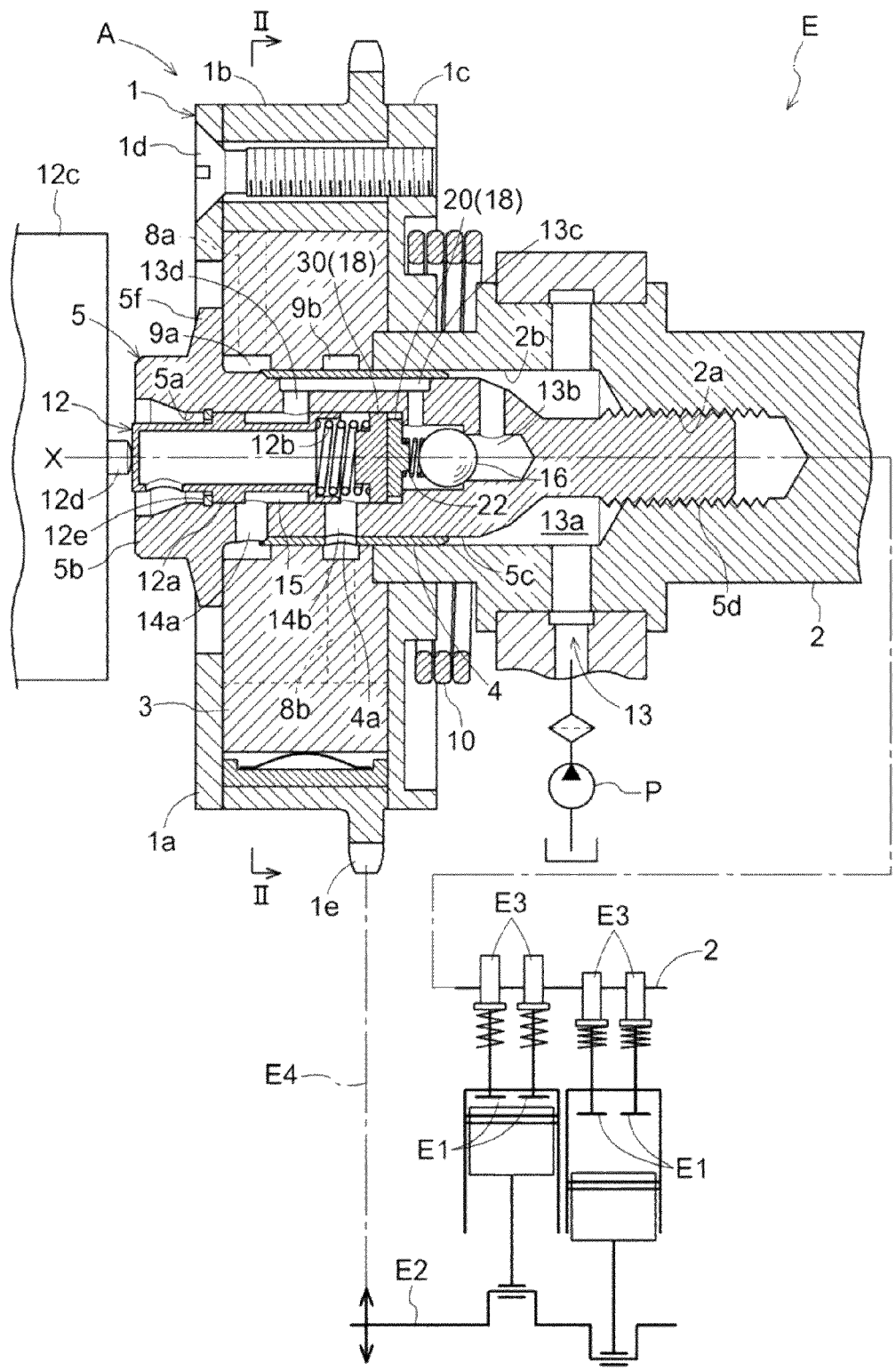
FIG. 1 is a cross-sectional view illustrating an entire configuration of a valve timing control apparatus according to an embodiment disclosed here.
Figure 2:
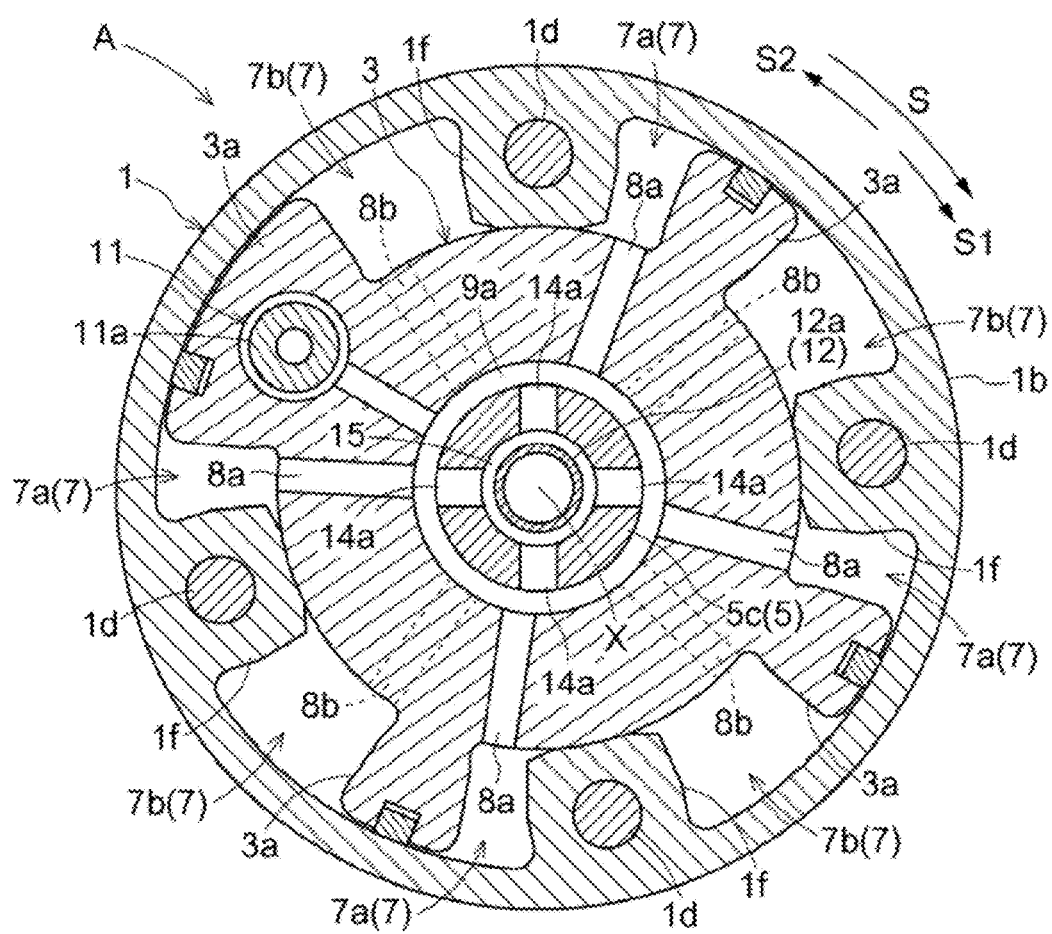
FIG. 2 is a cross-sectional view taken along line II-II in FIG. 1.

A basic configuration of a valve timing control apparatus will be described. As illustrated in FIGS. 1 and 2, a valve timing control apparatus A includes a housing 1 rotating about a rotary axis X synchronously with a crankshaft E2 of an engine E, and an inner rotor 3 supported at an inner side of the housing 1 to be rotatable about the rotary axis X integrally with a camshaft 2 for opening and closing an intake valve.

In the present embodiment, the engine E for an automobile serves as "an internal combustion engine", the crankshaft E2 serves as "a drive shaft of the internal combustion engine", the housing 1 serves as "a drive side rotary member", and the inner rotor 3 serves as "a driven side rotary member".

The housing 1 is configured by a front plate 1a arranged at a side opposite to the camshaft 2, an outer rotor 1b provided at an exterior of the inner rotor 3, and a rear plate 1c positioned at a side of the camshaft 2 in such a manner that the front plate 1a, the outer rotor 1b and the rear plate 1c are connected with a connection bolt 1d to be integral with one another. The outer rotor 1b is integrally provided with a timing sprocket 1e. An endless rotating body E4 including, for example, a metal chain is wound around the timing sprocket 1e, and the endless rotating body E4 moves together with or in association with the rotations of the crankshaft E2.

As the crankshaft E2 rotates and drives, the rotative power is transmitted by the endless rotating body E4 to the outer rotor 1b, and the housing 1 performs rotary drive in a rotation direction S illustrated in FIG. 2. In association with the rotary drive of the housing 1, the inner rotor 3 is driven and is rotated in the rotation direction 3, and thus the camshaft 2 rotates. Accordingly a cam E3 pushes an intake valve E1 of the engine E downwardly so that the intake valve E1 opens. For example, in the present embodiment, the plural cams E3 and the plural intake valves E1 are provided.

Figure 3:
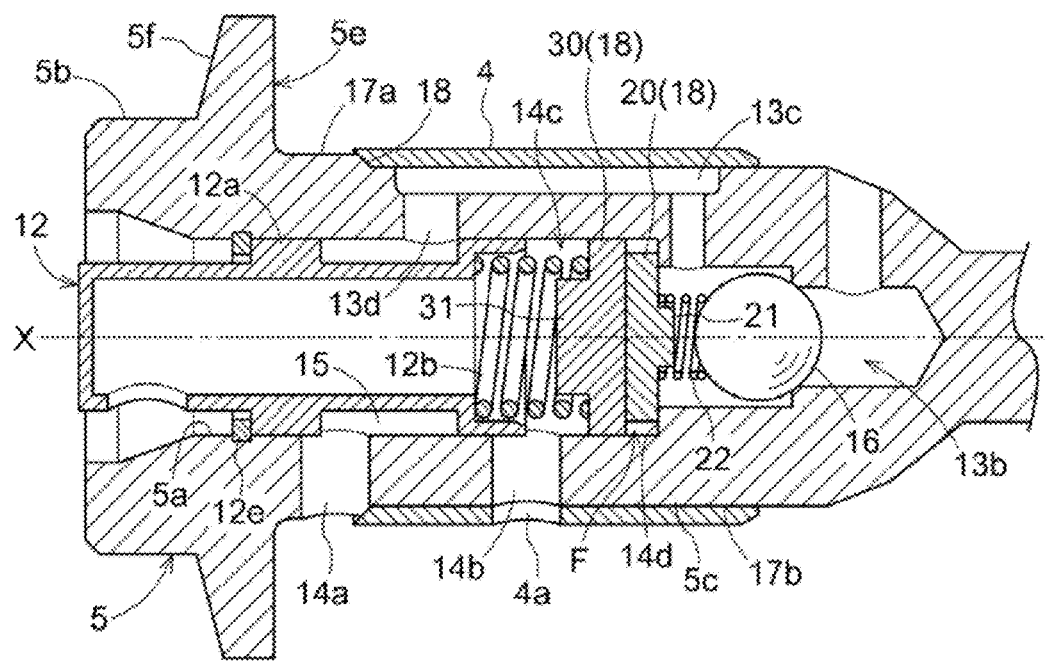
FIG. 3 is a cross-sectional view of an OCV (oil control valve) according to the embodiment disclosed here.
Figure 4:
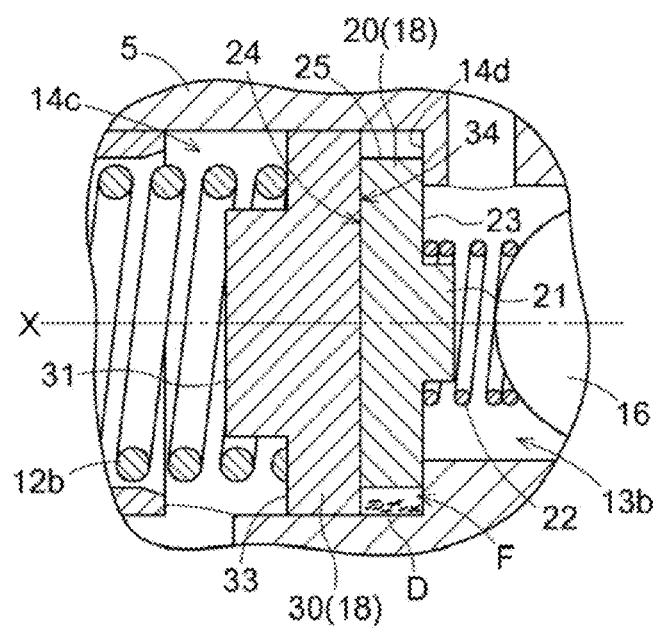
FIG. 4 is a cross-sectional view illustrating a flow passage partition structure according to the embodiment disclosed here.
Figure 5:
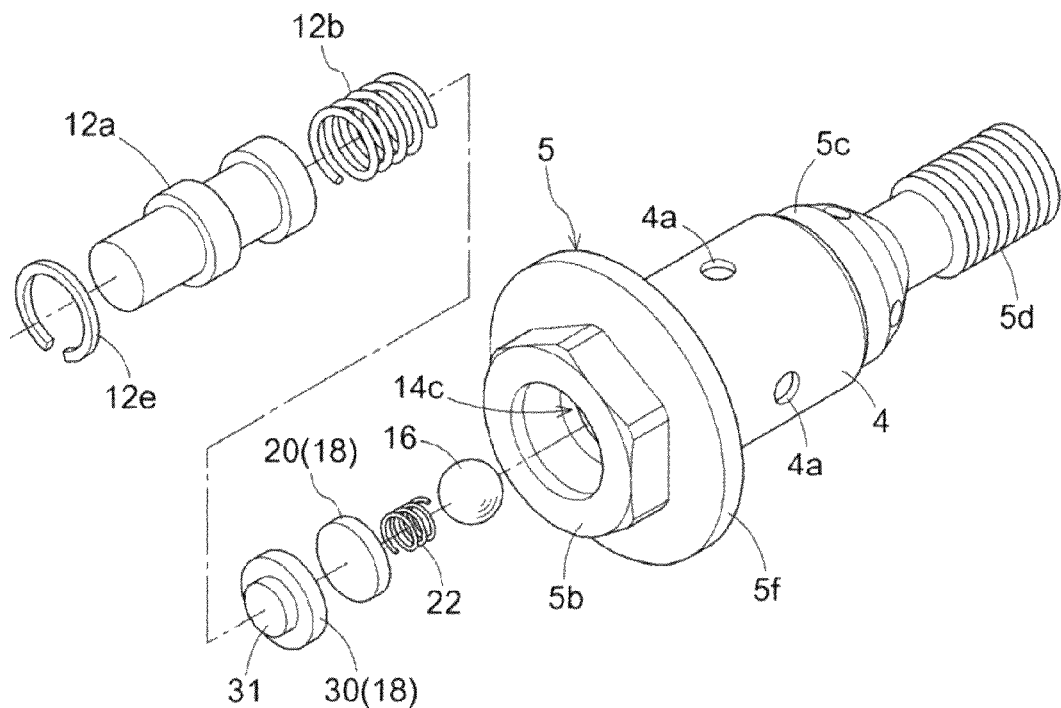
FIG. 5 is an exploded perspective view of a bolt including the oil control valve.

A sleeve 4, and a bolt 5 (an example of a flow passage member) connecting the inner rotor 3 and the camshaft 2 to each other are provided inside the inner rotor 3. As illustrated in FIG. 3, the bolt 5 is formed in a cylindrical configuration and including a cylindrical shaft portion 5c inserted through an inside of the sleeve 4, a bolt head 5b connected to the cylindrical shaft portion 5c, and a male threaded portion 5d connected to the cylindrical shaft portion 5c. The male threaded portion 5d is connected to a portion of the cylindrical shaft portion 5c which is different from a portion to which the bolt head 5b is connected. A hole portion formed in a direction of the rotary axis X is provided inside the cylindrical shaft portion 5c so as to serve as a flow passage space portion 5a. The flow passage space portion 5a includes an opening portion formed at the bolt head 5b.

As illustrated in FIG. 2, the inner rotor 3 is accommodated in the housing 1, and a fluid pressure chamber 7 is partitioned and defined between the housing 1 and the inner rotor 3. The fluid pressure chamber 7 is partitioned or divided by plural protruding portions 1f formed at the outer rotor 1b. The protruding portions 1f are formed to be spaced away from one another in the rotation direction S and protrude towards an inner side in a radial direction. Each of the pressure chambers 7 is further partitioned or divided into an advanced angle chamber 7a and a retarded angle chamber 7b in the rotation direction S by a protruding portion 3a protruding towards an outer side in the radial direction.

At the inner rotor 3, an advanced angle flow passage 8a which is in fluid communication with the advanced angle chamber 7a and a retarded angle flow passage 8b which is in fluid communication with the retarded angle chamber 7b are provided at positions which are different from each other in the direction of the rotary axis X. The advanced angle flow passage 8a is in fluid communication with an advanced angle annular flow passage 9a formed between the cylindrical shaft portion 5c and the inner rotor 3. The retarded angle flow passage 8b is in fluid communication with a retarded angle annular flow passage 9b formed at an inner circumferential surface of the inner rotor 3.

By supplying oil (working fluid, that is, fluid) to the advanced angle chamber 7a and the retarded angle chamber 7b, discharging the oil from the advanced angle chamber 7a and the retarded angle chamber 7b, or stopping the supply and the discharge of the oil to and from the advanced angle chamber 7a and the retarded angle chamber 7b, an oil pressure, that is, a hydraulic pressure is caused to work on the protruding portion 3a. Thus, a relative rotational phase of the inner rotor 3 relative to the housing 1 is displaced in an advanced angle direction or a retarded angle direction, or is kept in an arbitrary phase. A spring 10 biasing the inner rotor 3 relative to the housing 1 in the advanced angle direction is engaged and locked at the camshaft 2 in such a manner that the spring 1 straddles the camshaft 2 and the rear plate 1c.

The advanced angle direction is a direction which is indicated by an arrow S1 in FIG. 2 and in which a volume of the advanced angle chamber 7a increases. The retarded angle direction is a direction which is indicated by an arrow S2 in FIG. 2 and in which a volume of the retarded angle chamber 7b increases. When the volume of the advanced angle chamber 7a is maximized, the relative rotational phase is a most advanced phase. When the volume of the retarded angle chamber 7b is maximized, the relative rotational phase is a most retarded phase.

The valve timing control apparatus A includes a lock mechanism 11 that can restrict a relative rotary movement of the inner rotor 3 relative to the housing 1, and thus restrain and keep the relative rotational phase of the inner rotor 3 relative to the housing 1 at a lock phase between the most advanced phase and the most retarded phase (refer to FIG. 2). The lock mechanism 11 includes a lock member 11a that can move in the direction of the rotary axis X to be inserted in and to come out, by an operation of the oil pressure. As the lock member 11a is engaged with the front plate 1a or the rear plate 1c, the relative rotational phase of the inner rotor 3 relative to the housing 1 is restrained at the lock phase.

The camshaft 2 is a rotary shaft of the cam E3 controlling the opening and closing of the intake valve E1 of the engine E. At the camshaft 2, a threaded hole 2b is formed at a side at which the camshaft 2 is connected to the inner rotor 3. The threaded hole 2b is formed to be coaxial with the camshaft 2 and includes a female threaded portion 2a formed at an innermost side of the threaded hole 2b. The bolt 5 fastens the inner rotor 3 to the camshaft 2 coaxially with each other in such a manner that a male threaded portion 5d of the bolt 5 is threadedly engaged with the female threaded portion 2a of the camshaft 2.

A configuration of a fluid control valve will be described. As illustrated from FIG. 3 to FIG. 6, an OCV 12 (oil control valve) serving as "a fluid control valve" is provided at the flow passage space portion 5a formed inside the bolt 5. The OCV 12 is arranged coaxially with the camshaft 2. The OCV 12 switches the supply and the discharge of the oil relative to the advanced angle chamber 7a and the retarded angle chamber 7b via the advanced angle flow passage 8a and the retarded angle flow passage 8b so that the relative rotational phase of the inner rotor 3 and the housing 1 relative to each other is changed between the most advanced phase and the most retarded phase.

A partition member 18 is arranged at the flow passage space portion 5a formed at the bolt 5. By the partition member 18, a first flow passage 13b at an oil supply side and a second flow passage 14c at an oil discharge side are formed coaxially with the bolt 5. The partition member 18 is inserted from an opening end portion of the bolt 5 (that is, from a side of the second flow passage 14c in the present embodiment). At an innermost side in the insertion direction of the partition member 18, a step portion 14d is provided at a boundary between the first flow passage 13b and the second flow passage 14c. The second flow passage 14c is formed to include a diameter that is larger than a diameter of the first flow passage 13b.

The partition member 18 is formed of a first plate 20 and a second plate 30. The first plate 20 includes a diameter that is smaller than a diameter of the second plate 30. The first plate 20 is out of contact with an inner circumferential surface of the flow passage space portion 5a.

When assembling the partition member 18 to the flow passage space portion 5a, the first plate 20 and the second plate 30 are inserted in the mentioned order from the opening end portion of the bolt 5, the opening end portion which is positioned at a side of the second flow passage 14c. After the first plate 20 comes in contact with the step portion 14d at the innermost side in the insertion direction and closes or blocks the first flow passage 13b, the second plate 30 is inserted.

The second plate 30 is fitted into the flow passage space portion 5a of the bolt 5, and is brought into contact with the first plate 20 in such a manner that the second plate 30 overlaps the first plate 20. Thus, foreign material D might be generated from either the second plate 30 or an inner surface of the bolt 5. Most of the foreign material D is generated at the innermost side in the insertion direction of the second plate 30.

On the other hand, the first plate 20 is out of contact with the inner circumferential surface of the flow passage space portion 5a, and thus a space portion formed of an outer circumferential edge 25 of the first plate 20, the second plate 30 and the inner circumferential surface of the flow passage space portion 5a serves as a foreign material storage portion F. The foreign material D generated while the second plate 30 is being fitted into the flow passage space portion 5a can be accumulated and stored in the foreign material storage portion F. In addition, because the foreign material storage portion F is a closed space portion, the foreign material D can be retained in the foreign material storage portion F.

Accordingly, the foreign material D can be prevented from entering the first flow passage 13b and the second flow passage 14c.

The first plate 20 and the second plate 30 are formed of steel material, for example. The first plate 20 may be formed of material (steel material) of which surface hardness is lower than surface hardness of the second plate 30. The foreign material D might enter a region in which the first plate 20 and the second plate 30 face each other. In this case, as the foreign material D is sandwiched between the first plate 20 and the second plate 30, an adhesion property of the first plate 20 and the second plate 30 is deteriorated, and accordingly the second plate 30 may not be arranged in an appropriate posture or orientation.

In a case where the first plate 20 is formed of the material including the lower surface hardness than the second plate material 30, when the second plate 30 is brought into contact with the first plate 20, the foreign material D is pushed by the second plate 30 against the first plate 20 and can be embedded or buried into a surface layer of the first plate 20. Accordingly, the adhesion performance between the first plate 20 and the second plate 30 is maintained and the second plate 30 can be arranged in the appropriate posture.

As illustrated in FIG. 1, the OCV 12 includes a spool 12a including a cylindrical configuration, a spring 12b biasing the spool 12a from the second plate 30 in the direction of the rotary axis X, and an electromagnetic solenoid 12c drives and moves the spool 12a against a biasing force of the spring 12b. The second plate 30 is provided with a stop portion 31 formed in a protruding shape and positioning the spring 12b.

The spool 12a is accommodated in the second flow passage 14c of the flow passage space portion 5a of the bolt 5 so as to slidably reciprocate along the direction of the rotary axis X. The spool 12a is always biased by the spring 12b towards a side at which the spool 12a protrudes outwardly from the flow passage space portion 5a. A stopper piece 12e for preventing the spool 12a from coming off is provided at an inside the bolt 5.

As the electromagnetic solenoid 12c is supplied with electricity, the spool 12a is pushed by a push pin 12d and thereby slidably moves towards the camshaft 2. The OCV 12 can adjust a position of the spool 12a by adjusting a duty ratio of electric power supplied to the electromagnetic solenoid 12c. An amount of electric power supplied to the electromagnetic solenoid 12c is controlled by an ECU (electronic control unit).

The oil supplied from an outside by an oil pump P is supplied alternatively to the advanced angle flow passage 8a or to the retarded angle flow passage 8b via a supply flow passage 13 and the OCV 12. The supply flow passage 13 includes an outer circumferential flow passage 13a of the bolt 5, the first flow passage 13b, an introduction passage 13c, a first communication passage 13d, a second communication passage 14a and a third communication passage 14b.

The outer circumferential flow passage 13a is provided at the threaded hole 2b of the camshaft 2. The first flow passage 13b is provided inside the bolt 5. The introduction passage 13c is provided between the bolt 5 and the sleeve 4 to allow the oil in the first flow passage 13b to flow along the direction of the rotary axis X. The first communication passage 13d is formed to penetrate the cylindrical shaft portion 5c and allows the oil in the introduction passage 13c to flow into an inside of the cylindrical shaft portion 5c. The second communication passage 14a penetrates the cylindrical shaft portion 5c in a direction intersecting the rotary axis X. The third communication passage 14b penetrates the cylindrical shaft portion 5c and the sleeve 4 in the direction intersecting the rotary axis X.

The second communication passage 14a and the third communication passage 14b are provided at positions which differ from each other in a circumferential direction of the rotary axis X relative to the introduction passage 13c and differ from each other in the direction of the rotary axis X, so that the oil inside the bolt 5 flows to the advanced angle flow passage 8a and to the retarded angle flow passage 8b separately.

The sleeve 4 is formed with a sleeve-side communication passage 4a for allowing a fluid communication between the retarded angle annular flow passage 9b and the third communication passage 14b. The sleeve-side communication passage 4a is provided by forming an elongated hole around the rotary axis X.

The spool 12a includes a valve body circumferential groove 15 formed at an outer circumferential surface of the spool 12a in an annular configuration. The spool 12a switches between a neutral state in which the introduction passage 13c is out of fluid communication with the second communication passage 14a and the third communication passage 14b, an advanced angle control state in which the introduction passage 13c is in communication only with the second communication passage 14a (FIG. 3), and a retarded angle control state in which the introduction passage 13c is in fluid communication only with the third communication passage 14b. To be switched to the advanced angle control state, the supply of the electric power to the electromagnetic solenoid 12c is stopped. On the other hand, to be switched to the neutral state or to the retarded angle control state, the supply of the electric power to the electromagnetic solenoid 12c is controlled.

A ball type check valve 16 is provided inside the cylindrical shaft portion 5c, at an intermediate position of the first flow passage 13b. The check valve 16 is biased by a spring 22 towards a closing side. The first plate 20 is formed with a stop portion 21 which includes a protruding shape and positions the spring 22. In a case where a supply pressure of the oil is equal to or less than a set pressure, the check valve 16 blocks the flow of the oil into the introduction passage 13c and blocks a reverse flow of the oil from the introduction passage 13c. On the other hand, in a case where the supply pressure of the oil exceeds the set pressure, the check valve 16 allows the oil to flow into the introduction passage 13c.

In the neutral state, the spool 12a has moved to a position at which only the first communication passage 13d is in fluid communication with the valve body circumferential groove 15 and neither the second communication passage 14a or the third communication passage 14b is in fluid communication with the valve body circumferential groove 15. In the neutral state, the supply and discharge of the oil to and from the advanced angle chamber 7a and the retarded angle chamber 7b are stopped, and the relative rotational phase does not change.

In the advanced angle control state (FIG. 3), the spool 12a has moved to a position at which the first communication passage 13d and the second communication passage 14a are in fluid communication with each other via the valve body circumferential groove 15, and the third communication passage 14b is in fluid communication with the flow passage space portion 5a. In the advanced angle control state, the oil is supplied to the advanced angle chamber 7a via the advanced angle flow passage 8a and the oil in the retarded angle chamber 7b is discharged from the third communication passage 14b to the outside via the retarded angle flow passage 8b. In the advanced angle control state, the relative rotational phase changes in the advanced angle direction.

In the retarded angle control state, the spool 12a has moved to a position at which the first communication passage 13d and the third communication passage 14b are in fluid communication with each other via the valve body circumferential groove 15, and the second communication passage 14a is in fluid communication with the flow passage space portion 5a. In the retarded angle control state, the oil is supplied to the retarded angle chamber 7b via the retard angle flow passage 8b and the oil in the advanced angle chamber 7a is discharged to the outside via the advanced angle flow passage 8a. In the retarded angle control state, the relative rotational phase changes in the retarded angle direction.

Figure 6:
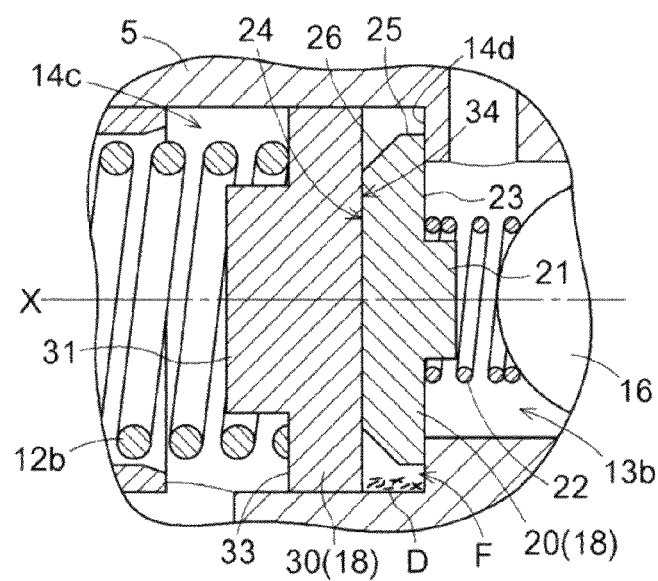

A second embodiment disclosed here will be described hereunder. As illustrated in FIG. 6, the first plate 20 is formed in such a manner that at least a part of the outer circumferential edge 25 of the first plate 20, the part which is at a side of the second plate 30, includes a diameter that is smaller than a diameter of the other part of the outer circumferential edge 25. In FIG. 6, a corner portion of the outer circumferential edge 25 of the first plate 20, the corner portion which intersects with a surface 24 at a side of the second plate 30 is cut off, and thus a chamfered portion 26 is formed. Because the foreign material storage portion F is expanded or increased by providing the chamfered portion 26, the foreign material storage portion F easily retains therein the foreign material D.

Figure 7:
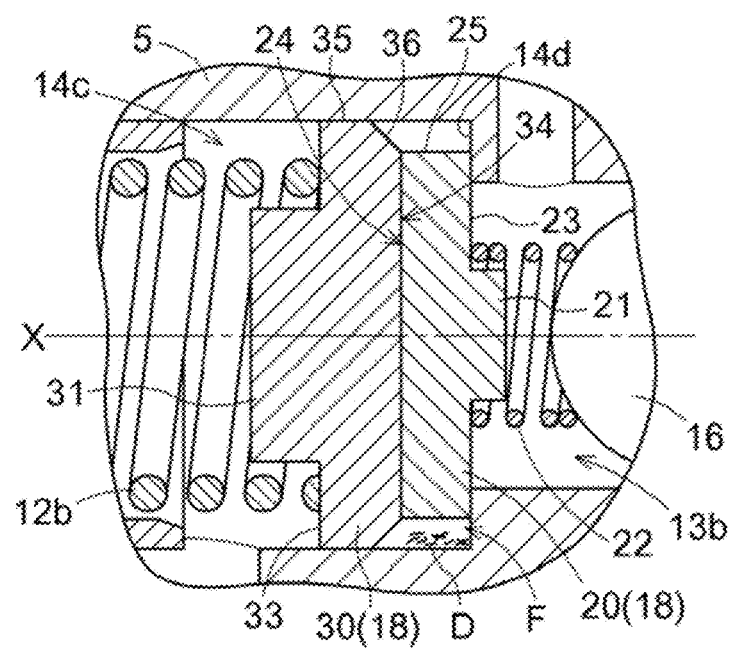
FIG. 7 is a cross-sectional view illustrating a flow passage partition structure according to another embodiment disclosed here.

A third embodiment disclosed here will be described hereunder. In the present embodiment, as illustrated in FIG. 7, the second plate 30 is formed in such a manner that at least a part of an outer circumferential edge 35 of the second plate 30, the part which is at a side of the first plate 20, includes a diameter that is smaller than a diameter of the other part of the outer circumferential edge 35. In FIG. 7, a corner portion of the outer circumferential edge 35 of the second plate 30, the corner portion which intersects with a surface 34 at a side of the first plate 20 is cut off, and thus a chamfered portion 36 is formed. Because the foreign material storage portion F is expanded or increased by providing the chamfered portion 36, the foreign material storage portion F easily retains therein the foreign material D. In addition, the chamfered portion 36 including the smaller diameter than the diameter of the other part of the outer circumferential edge may be used as a guide while the second plate 30 is being inserted in the flow passage space portion 5a of the bolt 5. Accordingly, the occurrence of the chip during the insertion of the second plate 30 is reduced, thereby facilitating the assembling work of the second plate 30 into the flow passage space portion 5a.

Figure 8:
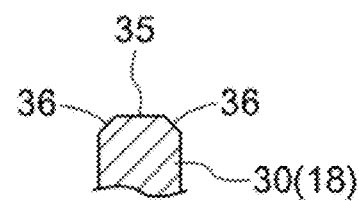
FIG. 8 is a cross-sectional view illustrating a flow passage partition structure according to another embodiment disclosed here.

A modification of the third embodiment disclosed here will be described hereunder. In the present embodiment, as illustrated in FIG. 8, the chamfered portion 36 is formed at each of the corner portions of the outer circumferential edge 35 of the second plate 30, that is, at the corner portion which intersects with the surface 34 at a side of the first plate 20 and at another corner portion which intersects with a surface 33 at a side opposite to the first plate 20. By forming the chamfered portion 36 at both the surfaces 33 and 34 of the second plate 30, the surface 33 and the surface 34 of the second plate 30 can be formed in an identical configuration in a case where the second plate 30 is not provided with the stop portion 31 for the spring 12b. Accordingly, the second plate 30 can be inserted into the flow passage space portion 5a of the bolt 5 without identification of the surface 33 and the surface 34. That is, the second plate 30 can be inserted into the flow passage space portion 5a of the bolt 5 from either the surface 33 first or the surface 34 first. Consequently, the assembling work of the second plate 30 into the flow passage space portion 5a is more facilitated.

Figure 9:
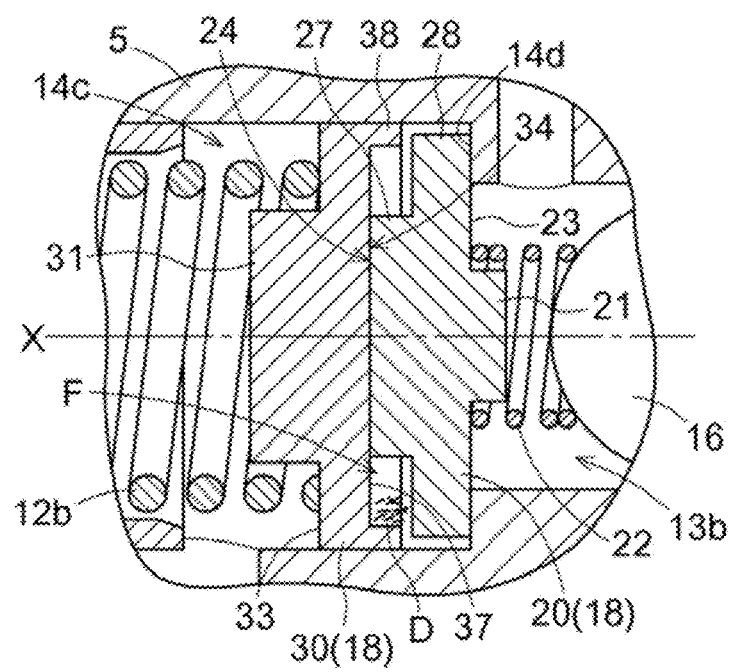
FIG. 9 is a cross-sectional view illustrating a flow passage partition structure according to another embodiment disclosed here.

A fourth embodiment disclosed here will be described hereunder. In the present embodiment, as illustrated in FIG. 9, the first plate 20 includes a protrusion 27 formed at the surface 24 at a side of the second plate 30. The second plate 30 includes a recess 37 formed at the surface 34 at a side of the first plate 20. By assembling or attaching the protrusion 27 of the first plate 20 and the recess 37 of the second plate 30 to each other, the foreign material storage portion F surrounded by an outer circumferential side of the protrusion 27 and an inner circumferential side of the recess 37 is formed. In the example illustrated in FIG. 9, an outer circumferential portion 28 of the first plate 20 and an outer circumferential portion 38 of the second plate 30 are separated from each other, however, the outer circumferential portion 28 of the first plate 20 and the outer circumferential portion 38 of the second plate 30 may be configured to be in contact with each other. Due to this configuration, the foreign material storage portion F formed between the protrusion 27 of the first plate 20 and the recess 37 of the second plate 30 is closed, and accordingly the foreign material D can be contained or confined completely at the inner circumferential side of the second plate 30.

Other embodiment will be described hereunder. In each of the aforementioned embodiments, the explanation is made on the case in which the present disclosure is applied, at the valve timing control apparatus A of the engine E, to the flow passage space portion 5a of the bolt 5 at which the OCV 12 is provided. However, a range of application of the present disclosure is not limited thereto, and the present disclosure may be applied to a flow passage space portion for controlling a various types of hydraulic equipment. Further, the present disclosure may be applied to a flow passage space portion for a various types of fluids other than the oil, that is, hydraulic.

The flow passage partition structure related to the embodiments disclosed here can be widely used for a flow passage space portion formed at a flow passage member.

According to the aforementioned embodiment, the flow passage partition structure includes the bolt 5 (i.e., the flow passage member) including the flow passage space portion 5a through which the working fluid flows, the partition member 18 partitioning the flow passage space portion 5a into the first flow passage 13b and the second flow passage 14c, and the partition member 18 including the first plate 20 being inserted into the flow passage space portion 5a from the one opening end portion of the bolt 5, and being in contact with the step portion 14d provided at the boundary between the first flow passage 13b and the second flow passage 14c at the innermost side in the insertion direction of the first plate 20, the second plate 30 being inserted into the flow passage space portion 5a after the first plate 20 is inserted into the flow passage space portion 5a, the second plate 30 being in contact with the first plate 20 in such a manner that the second plate 30 overlaps the first plate 20 in a state where the second plate 30 is press-fitted in the inner circumferential surface of the flow passage space portion 5a, the first plate 20 including the outer circumferential surface that is out of contact with the inner circumferential surface of the flow passage space portion 5a, and the first plate 20, the second plate 30, and the inner circumferential surface of the flow passage space portion 5a forming the space portion that corresponds to the foreign material storage portion F.

According to the above described configuration, in a case where the partition member 18 is press-fitted from the one opening end portion of the bolt 5 so that the partition member 18 partitions the flow passage space portion 5a, the foreign material may be generated at the innermost side in the partition member 18 in the press-fitting direction. In this regard, in the above described configuration, the space portion defined by the first plate 20 and the second plate 30 which form the partition member 18, and the inner circumferential surface of the flow passage space portion 5a serves as the foreign material storage portion F. Accordingly, even if the foreign material D is generated, the foreign material D is confined in the foreign material storage portion F. Consequently, the foreign material D can be prevented from entering the first flow passage 13b and the second flow passage 14c that are partitioned or divided by the partition member 18.

According to the aforementioned embodiment, the first plate 20 is formed by the material of which the surface hardness is lower than the surface hardness of the second plate 30.

The foreign material D generated during the press-fitting of the second plate 30 might enter the region in which the first plate 20 and the second plate 30 face each other. As the foreign material D is sandwiched between the first plate 20 and the second plate 30, the adhesion property of the first plate 20 and the second plate 30 is deteriorated, and accordingly the second plate 30 may not be arranged in the appropriate posture. However, according to the above described configuration, the first plate 20 is formed of the material whose surface hardness is lower than the surface hardness of the second plate 30. Thus, when the second plate 30 comes into contact with the first plate 20, the foreign material D pushed against the first plate 20 can be embedded or buried into the surface layer of the first plate 20. Accordingly, the adhesion property of the first plate 20 and the second plate 30 is maintained, and the second plate 30 can be arranged in the appropriate posture.

According to the aforementioned embodiment, the first plate 20 includes the outer circumferential edge 25 and at least a part of the outer circumferential edge 25 which is at a side of the second plate 30 is formed to include the diameter smaller than the diameter of the other part of the outer circumferential edge 25.

According to the above described configuration, the region of the foreign material storage portion F is increased by providing, for example, the chamfering to the outer circumferential edge 25 of the first plate 20. Consequently, the foreign material D is stored at the foreign material storage portion F easily.

According to the aforementioned embodiment, the second plate 30 includes the outer circumferential edge 35 and at least a part of the outer circumferential edge 35 which is at a side of the first plate 20 is formed to include the diameter smaller than the diameter of the other part of the outer circumferential edge 35.

According to the above described configuration, the region of the foreign material storage portion F is increased by providing, for example, the chamfering to the outer circumferential edge 35 of the second plate 30. Consequently, the foreign material D is stored at the foreign material storage portion F easily. In addition, because the surface of the second plate 30, the surface which faces the first plate 20, includes the small diameter, the resistance during the press-fitting of the second plate 30 can be reduced. As a result, the generation of the chip is restricted, thereby facilitating the assembling work of the second plate 30 into the flow passage space portion 5a.

According to the aforementioned embodiment, the oil control valve 12 of the valve timing control apparatus A includes the passage partition structure including the bolt 5 including the flow passage space portion 5a through which the working fluid flows, and the partition member 18 partitioning the flow passage space portion 5a into the first flow passage 13b and the second flow passage 14c, the partition member 18 including the first plate 20 being inserted into the flow passage space portion 5a from the one opening end portion of the bolt 5, and being in contact with the step portion 14d provided at the boundary between the first flow passage 13b and the second flow passage 14c at the innermost side in the insertion direction of the first plate 20, the second plate 30 being inserted into the flow passage space portion 5a after the first plate 20 is inserted into the flow passage space portion 5a, the second plate 30 being in contact with the first plate 20 in such a manner that the second plate 30 overlaps the first plate 20 in a state where the second plate 30 is press-fitted in the inner circumferential surface of the flow passage space portion 5a, the first plate 20 including the outer circumferential surface that is out of contact with the inner circumferential surface of the flow passage space portion 5a, and the first plate 20, the second plate 30, and the inner circumferential surface of the flow passage space portion 5a forming the space portion that corresponds to the foreign material storage portion F, wherein the first plate 20 and the second plate 30 are inserted in the hole portion 5a provided at the bolt 5 in the direction of the rotary axis X, and the first flow passage 13b and the second flow passage 14c are provided at the hole portion 5a, and the oil control valve 12 supplies and discharges working fluid relative to the fluid pressure chamber 7. The valve timing control apparatus A includes the housing 1 rotating synchronously with the crankshaft E2 of the engine E, the inner rotor 3 arranged coaxially with the housing 1 and rotating synchronously with the camshaft 2 of the engine E, the fluid pressure chamber 7 provided at least one of the housing 1 and the inner rotor 3, and divided into the advanced angle chamber 7a and the retarded angle chamber 7b, and the bolt 5 arranged by insertion in the inner rotor 3 to be coaxially with the rotary axis X of the inner rotor 3 and connecting the inner rotor 3 and the camshaft 2 to each other.

The flow passage partition structure according to the aforementioned embodiment can be applied to the hole portion 5a serving as the flow passage space portion 5a for the OCV (oil control valve) 12 formed at the bolt 5 of the valve timing control apparatus A. The hole portion 5a formed at the center of the bolt 5 is partitioned or divided by the partition member 18, and accordingly the complicated oil passages supplying, for example, the working oil to or discharging the working oil from the advanced angle chamber 7a or the retarded angle chamber 7b can be formed efficiently.

The flow passage partition structure includes the bolt 5 (i.e., the flow passage member) including the flow passage space portion 5a through which the working fluid flows, the partition member 18 partitioning the flow passage space portion 5a into the first flow passage 13b and the second flow passage 14c, and the partition member 18 including the first plate 20 provided at the flow passage space portion 5a in such a manner that the first plate 20 is inserted into the flow passage space portion 5a from one opening end portion of the bolt 5, the first plate 20 being in contact with a step portion 14d provided at the boundary between the first flow passage 13b and the second flow passage 14c at the innermost side in the insertion direction of the first plate 20, the second plate 30 provided at the flow passage space portion 5a in such a manner that the second plate 30 is inserted into the flow passage space portion 5a after the first plate 20 is inserted into the flow passage space portion 5a, the second plate 30 being in contact with the first plate 20 in such a manner that the second plate 30 overlaps the first plate 20 in a state where the second plate 30 is press-fitted in the inner circumferential surface of the flow passage space portion 5a, the first plate 20 including the outer circumferential surface that is out of contact with the inner circumferential surface of the flow passage space portion 5a, and the first plate 20, the second plate 30, and the inner circumferential surface of the flow passage space portion 5a forming the space portion that corresponds to the foreign material storage portion F.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A flow passage partition structure comprising:
a flow passage member including a flow passage space portion through which fluid flows;
a partition member partitioning the flow passage space portion into a first flow passage and a second flow passage; and
the partition member comprising:
a first plate being inserted into the flow passage space portion from one opening end portion of the flow passage member, and being in contact with a step portion provided at a boundary between the first flow passage and the second flow passage at an innermost side in an insertion direction of the first plate;
a second plate being inserted into the flow passage space portion after the first plate is inserted into the flow passage space portion, the second plate being in contact with the first plate in such a manner that the second plate overlaps the first plate in a state where the second plate is press-fitted in an inner circumferential surface of the flow passage space portion;
the first plate including an outer circumferential surface that is out of contact with the inner circumferential surface of the flow passage space portion; and
the first plate, the second plate, and the inner circumferential surface of the flow passage space portion forming a space portion that corresponds to a foreign material storage portion.

2. The flow passage partition structure according to claim 1, wherein the first plate is formed by material of which surface hardness is lower than surface hardness of the second plate.

3. The flow passage partition structure according to claim 2, wherein the first plate includes an outer circumferential edge and at least a first part of the outer circumferential edge which is at a side of the second plate is formed to include a diameter smaller than a diameter of a second part of the outer circumferential edge.

4. The flow passage partition structure according to claim 2, wherein the second plate includes an outer circumferential edge and at least a first part of the outer circumferential edge which is at a side of the first plate is formed to include a diameter smaller than a diameter of a second part of the outer circumferential edge.

5. The flow passage partition structure according to claim 1, wherein the first plate includes an outer circumferential edge and at least a first part of the outer circumferential edge which is at a side of the second plate is formed to include a diameter smaller than a diameter of a second part of the outer circumferential edge.

6. The flow passage partition structure according to claim 1, wherein the second plate includes an outer circumferential edge and at least a first part of the outer circumferential edge which is at a side of the first plate is formed to include a diameter smaller than a diameter of a second part of the outer circumferential edge.

7. A fluid control valve of a valve timing control apparatus,
the valve timing control apparatus comprising:
a drive side rotary member rotating synchronously with a crankshaft of an internal combustion engine;
a driven side rotary member arranged coaxially with the drive side rotary member and rotating synchronously with a camshaft of the internal combustion engine;
a fluid pressure chamber divided into an advanced angle chamber and a retarded angle chamber; and
a bolt arranged by insertion in the driven side rotary member to be coaxial with a rotary axis of the driven side rotary member and connecting the driven side rotary member and the camshaft to each other,
the fluid control valve including a passage partition structure comprising:
a flow passage member including a flow passage space portion through which fluid flows; and
a partition member partitioning the flow passage space portion into a first flow passage and a second flow passage;
the partition member including:
a first plate being inserted into the flow passage space portion from one opening end portion of the flow passage member, and being in contact with a step portion provided at a boundary between the first flow passage and the second flow passage at an innermost side in an insertion direction of the first plate;
a second plate being inserted into the flow passage space portion after the first plate is inserted into the flow passage space portion, the second plate being in contact with the first plate in such a manner that the second plate overlaps the first plate in a state where the second plate is press-fitted in an inner circumferential surface of the flow passage space portion;
the first plate including an outer circumferential surface that is out of contact with the inner circumferential surface of the flow passage space portion; and
the first plate, the second plate, and the inner circumferential surface of the flow passage space portion forming a space portion that corresponds to a foreign material storage portion, wherein
the first plate and the second plate are inserted in a hole portion provided in a direction of the rotary axis at the bolt, and the first flow passage and the second flow passage are provided at the hole portion, and
the fluid control valve supplies and discharges working fluid relative to the fluid pressure chamber.

8. The fluid control valve of the valve timing control apparatus according to claim 7, wherein the first plate is formed by material of which surface hardness is lower than surface hardness of the second plate.

9. The fluid control valve of the valve timing control apparatus according to claim 8, wherein the first plate includes an outer circumferential edge and at least a first part of the outer circumferential edge which is at a side of the second plate is formed to include a diameter smaller than a diameter of a second part of the outer circumferential edge.

10. The fluid control valve of the valve timing control apparatus according to claim 8, wherein the second plate includes an outer circumferential edge and at least a first part of the outer circumferential edge which is at a side of the first plate is formed to include a diameter smaller than a diameter of a second part of the outer circumferential edge.

11. The fluid control valve of the valve timing control apparatus according to claim 7, wherein the first plate includes an outer circumferential edge and at least a first part of the outer circumferential edge which is at a side of the second plate is formed to include a diameter smaller than a diameter of a second part of the outer circumferential edge.

12. The fluid control valve of the valve timing control apparatus according to claim 7, wherein the second plate includes an outer circumferential edge and at least a first part of the outer circumferential edge which is at a side of the first plate is formed to include a diameter smaller than a diameter of a second part of the outer circumferential edge.

* * * * *